United States Patent
Hunter et al.

(10) Patent No.: US 6,477,829 B1
(45) Date of Patent: Nov. 12, 2002

(54) COMBINED CYCLE PULSE COMBUSTION/ GAS TURBINE ENGINE

(75) Inventors: Louis G. Hunter, Fort Worth, TX (US); Billy D. Couch, Fort Worth, TX (US); Paul E. Hagseth, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/567,374

(22) Filed: May 9, 2000

(51) Int. Cl.[7] ............................................. F02K 3/11
(52) U.S. Cl. ........................ 60/225; 60/226.1; 60/247
(58) Field of Search ..................... 60/224, 225, 226.1, 60/247, 248, 249; 244/62

(56) References Cited

U.S. PATENT DOCUMENTS

| | | | |
|---|---|---|---|
| 2,635,420 A | * 4/1953 | Jonker | 60/247 |
| 2,998,703 A | * 9/1961 | Badders | 60/247 |
| 3,348,380 A | * 10/1967 | Rees | 60/225 |
| 5,345,758 A | 9/1994 | Bussing | 60/39.38 |
| 5,353,588 A | 10/1994 | Richard | 60/39.38 |
| 5,473,885 A | 12/1995 | Hunter, Jr. et al. | 60/204 |
| 5,513,489 A | 5/1996 | Bussing | 60/39.38 |
| 5,546,744 A | 8/1996 | Winfree et al. | 60/247 |
| 5,557,926 A | 9/1996 | Hunter, Jr. et al. | 60/247 |
| 5,579,633 A | 12/1996 | Hunter, Jr. et al. | 60/204 |
| 5,615,548 A | 4/1997 | Winfree et al. | 60/39.78 |
| 5,672,184 A | 9/1997 | Hunter, Jr. | 48/77 |
| 5,855,827 A | 1/1999 | Bussing et al. | 264/7 |
| 5,864,517 A | 1/1999 | Hinkey et al. | 367/145 |
| 5,873,240 A | 2/1999 | Bussing et al. | 60/207 |
| 5,901,550 A | 5/1999 | Bussing et al. | 60/39.38 |
| 5,937,635 A | 8/1999 | Winfree et al. | 60/39.38 |
| 6,003,301 A | 12/1999 | Bratkovich et al. | 60/204 |

* cited by examiner

Primary Examiner—Louis J. Casaregola
(74) Attorney, Agent, or Firm—Bracewell & Patterson, L.L.P.

(57) ABSTRACT

A combined cycle pulse combustion/gas turbine engine has a gas turbine engine used in conjunction with a plurality of pulse combustion engines. In one embodiment, the gas turbine engine includes a housing, a bypass fan, a central engine core, and a diffuser section. The diffuser section is used to route bypass air from the bypass fan around the central engine core and out of the housing. The pulse engines are mounted in the diffuser section and receive bypass air from the bypass fan. In a first alternate embodiment, bypass air is routed from the diffuser section through a duct to the pulse engine. A valve is disposed between the bypass fan and the pulse engines for selectively allowing bypass air from the bypass fan to enter the duct. In a second alternate embodiment, a fan mounts to each inlet port. The gas turbine engine has a drive shaft that drives the fan. A clutch selectively disengages the fans.

9 Claims, 5 Drawing Sheets

COMBINED CYCLE PULSE COMBUSTION/ GAS TURBINE ENGINE

BACKGROUND OF THE INVENTION

1. Field of the Invention

This invention relates in general to engines and in particular to intermittent combustion engines in which the combustion products are used as the thrust producing medium.

2. Description of Related Art

A pulse combustion engine such as a pulse detonation engine is an apparatus which produces a high pressure exhaust from a series of repetitive combustions within a combustion chamber. A fuel is detonated within a chamber, causing a wave which propagates at high speeds. The speeds could approach or exceed Chapman Jouguet detonation velocities. The wave compresses the fluid within the chamber, increasing its pressure, density, and temperature. As the wave passes out the open rearward end, thrust is created. The cycle is then repeated.

The pulse combustion engine (detonation or deflagration or combination of both) contains no means at present to generate shaft power to run electrical and hydraulic systems of the vehicle being propelled. If the pulse combustion engine is combined in an integral manner with a jet engine, then both systems benefit from this combined cycle, in terms of shaft power output and increased Mach number capability. Current production gas turbine engines are limited to an upper Mach number of approximately 2. The strength of the pulse combustion engine is the lack of turbomachinery downstream of the combustion region, which limits the upper useful speed of the jet engine. Combining the jet engine and the pulse engine produces a composite combined cycle engine that can provide shaft power and supply the required thrust over a wide range of speeds. At high speeds (e.g., Mach 4) the jet engine essentially runs at idle, supplying shaft power, but very little thrust. At these same speeds the pulse engine has adequate ram air pressure to supply the required thrust and does not rely on the jet engine for high pressure input air. At lower speeds (e.g., Mach 0 to 1) the jet engine supplies high pressure air to the pulse combustion engines by fan bypass air, compressor bleed or by a shaft which turns one or more independent fans to pressurize the flow going into the pulse jets. For this Mach regime the pulse engine acts as an afterburner for the jet engine or as an afterburner supplement if the jet has an integrated afterburner. This combination of pulse combustion and gas turbine engines can generate high levels of thrust efficiently across a wide range of flight speeds— higher than is possible with either engine separately.

BRIEF SUMMARY OF THE INVENTION

The combined cycle pulse combustion/gas turbine engine of the present invention solves the problems individually associated with each of these engines. The invention includes a gas turbine engine and a plurality of pulse combustion engines that work together over various aircraft speed ranges.

In the first embodiment, the turbine engine includes a housing, a high bypass ratio fan, and a central engine core. The housing has an annular diffuser section outside of the central engine core for diverting bypass air from the bypass fan around the central engine core and out of the housing. The bypass fan typically bypasses one to five parts of air for every one part of air that is ingested by the central engine core.

The pulse combustion engines each include an inlet port, a combustion chamber, and a valve for admitting fuel and air to the chamber. The pulse combustion engines are disposed within the annular diffuser section of the gas turbine engine. As air bypasses the central engine core, a portion of the air enters the pulse engines. Typically, the amount of air allowed to enter the pulse engines by the bypass valve is dependent on the opening and closing rate of the pulse engines' rotary valves.

In a second embodiment, a similar gas turbine engine having a diffuser section is used. A pulse combustion engine is fluidly connected to the diffuser section by a duct. As air bypasses the central engine core, a portion of the air is allowed to enter the pulse combustion engine through the duct. The duct may or may not include a bypass valve for regulating the amount of air allowed to enter the duct.

Finally, a third embodiment of the present invention includes a series of pulse combustion engines used in conjunction with a jet engine. The jet engine drives a drive shaft connected to an external fan. The fan supplies air to the pulse engines. A clutch is disposed between the jet engine and the fan, the clutch selectively disengaging the fan during certain operational conditions.

DETAILED DESCRIPTION OF THE PREFERRED EMBODIMENT

Figure 1:
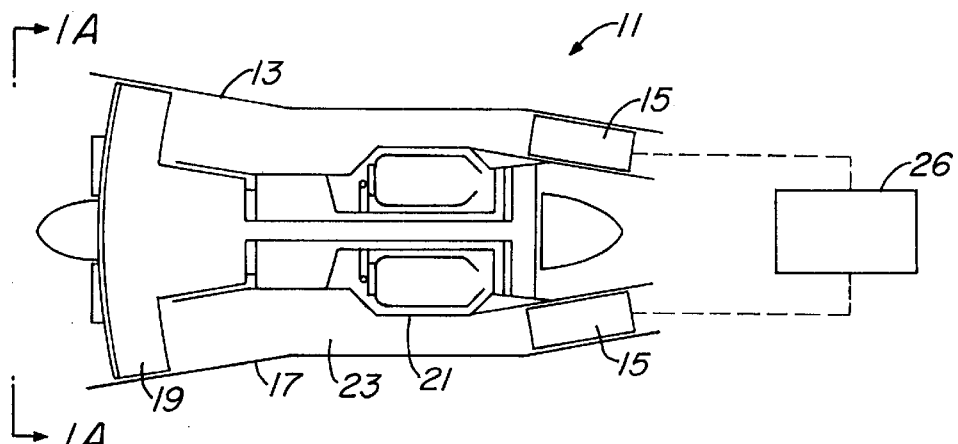
FIG. 1 is a schematic side view of a first embodiment of a pulse combustion engine and turbine engine combination according to the present invention.
Figure 1A:
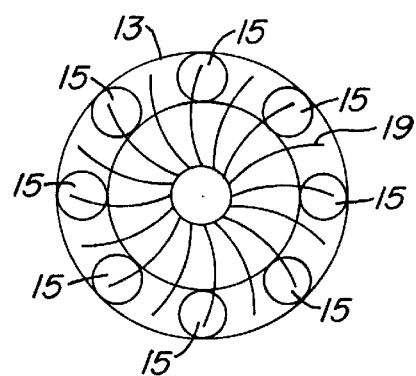
FIG. 1A is a schematic front view of the combination engine of FIG. 1, taken along line 1A—1A.

Referring to FIGS. 1 and 1A, the preferred embodiment of a combined cycle pulse combustion/gas turbine engine 11 according to the present invention is illustrated. The combination engine 11 includes a gas turbine engine 13 and a plurality of pulse combustion engines 15. Gas turbine engine 13 includes a housing 17, a bypass fan 19, a central engine core 21, and a diffuser section 23 extending laterally from housing 17. Gas turbine engine 13, with its high bypass ratio fan 19, typically bypasses one to five parts of air through fan 19 for every one part of air ingested by central engine core 21. The air that does not pass through central engine core 21 is considered bypass air. Gas turbine engine 13 develops thrust with a constant pressure, increasing volume process.

Pulse combustion engines 15 are mounted in the annular space created by diffuser section 23. The number of pulse combustion engines 15 situated around gas turbine engine 13 could range from a single engine to several engines. The plurality of pulse combustion engines 15 receive all or part of the bypass air. Bypass air is injected into pulse combustion engines 15 as needed to operate pulse combustion engines 15. A controller 26 initializes the operation of pulse combustion engines 15. Controller 26 will preferably be a part of the aircraft's computer system.

Two general types of combustion are possible for use in the pulse combustion engine(s). The first is deflagration combustion. This is usually characterized with a subsonic flame speed and constant pressure thermodynamic process. The second combustion is detonation. Detonation is usually characterized with supersonic flame speed and constant volume thermodynamic process. In actual practice, both processes may occur in a combustion chamber, especially when the combustion process is started with deflagration and transitions to detonation.

Figure 2:
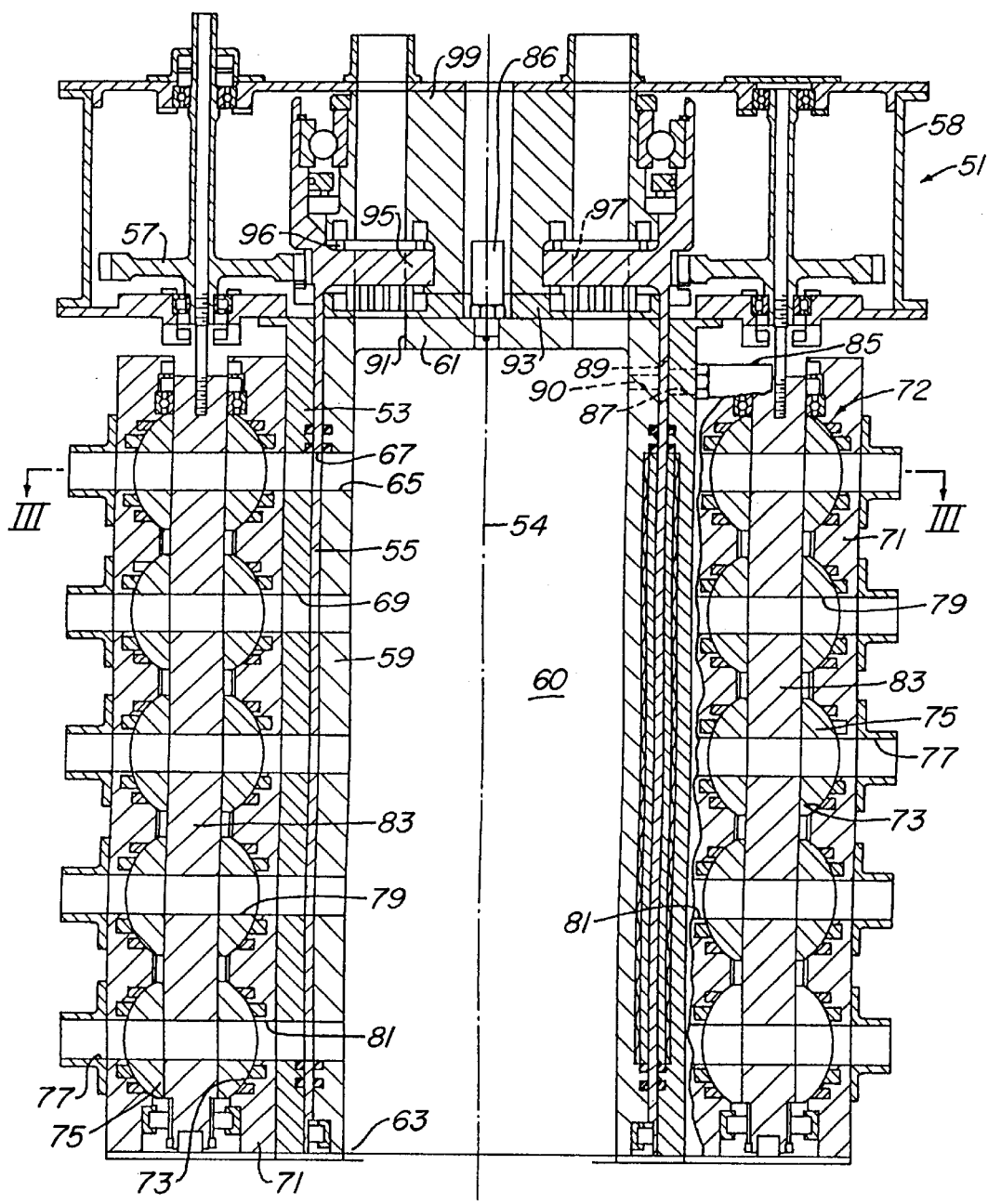
FIG. 2 is a more detailed cross-sectional view illustrating the pulse combustion engine of FIG. 1.
Figure 3A:
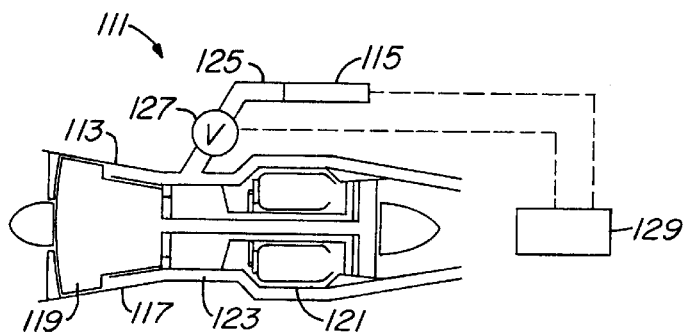
FIG. 3A is a schematic side view of an alternate embodiment of a pulse combustion/gas turbine engine combination according to the present invention.
Figure 3:
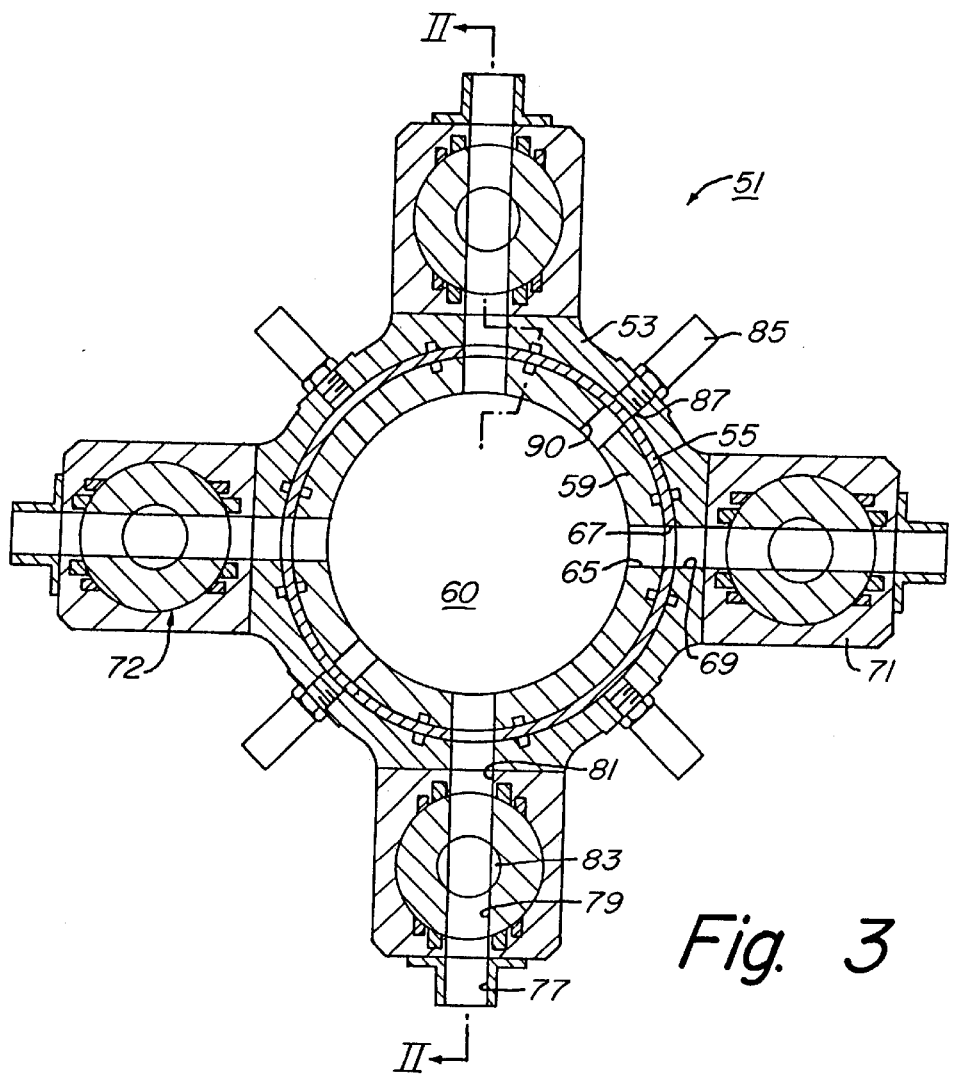
FIG. 3 is a sectional view of the pulse combustion apparatus of FIG. 1, taken along the line III—III of FIG. 2.

Referring to FIGS. 2 and 3, a typical pulse combustion engine 51 is illustrated. Although many different variations of a pulse combustion could be used in the present invention, pulse combustion engine 51 represents a typical engine to use in the combination described herein. Pulse combustion engine 51 has a tubular cylinder or housing 53. Housing 53 has a bore with a longitudinal axis 54. A valve sleeve 55 is rotatably carried in the bore of housing 53, concentric with axis 54. Valve sleeve 55 is also a cylinder, having its exterior closely received within housing 53. A gear train 57 located within a gear case 58 will be connected to an external drive source for rotating valve sleeve 55 relative to the stationary housing 53. The external drive source will be powered by gas turbine engine 13.

A cylindrical liner 59 is stationarily mounted within the inner diameter of sleeve 55. Liner 59 is secured by fasteners (not shown) to the gear case 58. The bore or interior of liner 59 serves as a combustion chamber 60. Liner 59 is made of a material that withstands high temperatures and has sufficient strength to withstand the high pressures created. Liner 59 has an upstream end wall 61 which forms the upstream end wall of combustion chamber 60. Liner 59 has an open downstream end 63 through which combustion pulses discharge.

Liner 59 has a plurality of liner ports 65 extending through its sidewall. As shown in FIG. 3, there are four sets of liner ports 65, each set spaced 90 degrees apart from each other. As shown in FIG. 2, each set has five liner ports 59 evenly spaced apart from each other along longitudinal axis 54. Valve sleeve 55 has a plurality of valve sleeve ports 67 which are spaced in the same manner as liner ports 65. There are four radially spaced sets of valve sleeve ports 67, each set having five ports 67 spaced along longitudinal axis 54. Similarly, housing 53 has a port 69 radially aligned with each of the liner ports 65. As gear train 57 rotates valve sleeve 55, valve sleeve ports 67 will align with liner ports 65 and housing ports 69 four times per revolution.

Four manifolds 71 are mounted to the exterior of housing 53. Manifolds 71 are spaced 90 degrees apart from each other, as shown in FIG. 3. Each manifold 71 has five outer valves 72, each of which corresponds to one of the liner ports 65 and housing ports 69. Each of the outer valves 72 has a concave seat 73 which may be generally spherical or elliptical. A mating convex valve element 75 is rotatably carried within each seat 73. Manifold 71 has a manifold inlet port 77 that is located on a radial line with one of the housing ports 69 and liner ports 65. Valve element 75 has a valve passage 79 which extends through valve element 75 perpendicular to longitudinal axis 54. Manifold 71 has a manifold outlet port 81 for each of the valve inlet ports 77, the outlet ports 81 being radially aligned with one of the manifold inlet ports 77.

As the valve element 75 rotates, valve passage 79 will align and communicate manifold inlet port 77 with manifold outlet port 81 twice per revolution. An outer valve drive means includes a shaft 83 which extends parallel to longitudinal axis 54. Shaft 83 extends through each of the valve elements 75 and is rigidly secured to the valve elements 75 for rotating. Shaft 83 is driven by drive train 57. The rotation speed of shaft 83 is synchronized with the rotation speed of valve sleeve 55 so that valve passage 79 will open the manifold ports 77, 81 simultaneously with the opening of the liner ports 65 and housing ports 69. In the drawings, the ports 65, 69, 77, and 81 are shown in the open position.

The manifold inlet ports 77 are connected to sources of fuel and oxydizer. The fuel will normally be gaseous hydrocarbon unmixed with oxydizer. Pure oxygen will preferably be supplied to some of the other manifold inlet ports 77. Preferably, each manifold inlet port 77 which is supplied with fuel will be spaced 180 degrees apart from a manifold inlet port 77supplied with an oxydizer. The opposed inward flows of fuel and oxydizer enhance mixing. Also, the fuel and oxygen inlets could be staggered along the axis 54. For example, the most upstream four valves 72 could be supplied with fuel at the zero and 180 degree valve locations and oxygen at the 90 and 270 degree valve locations. The second most upstream group of four valves 72 could be supplied with fuel at the 90 and 270 degree valve locations and oxygen at the zero and 180 degree valve locations. Air is preferably supplied from diffuser section 23 to some of the inlet ports 77, particularly those located toward the open downstream end 63. The unmixed fuel and oxygen will flow into the combustion chamber 60 where they mix for combustion.

Combustion is performed by igniters 85, 86, which may be either spark-type or lasers. As shown in FIGS. 2 and 3, four radially oriented igniters 85 are spaced 90 degrees apart from each other near liner upstream end wall 61. Igniters 85 are contained within a single radial plane. Igniter 86 is optional and is shown axially oriented in liner upstream end wall 61 on longitudinal axis 54. If igniters 85 are lasers rather than spark-type, they will emit a beam of light through a lens 87 contained in housing 53, which focuses the beam on axis 54. Valve sleeve 55 has four igniter ports 89 which will register with lenses 87 and with igniter ports 90 in liner 59 to allow the beams to pass through four times per revolution of valve sleeve 55. Valve sleeve igniter ports 89 are positioned so that they open the path for each igniter 85 after the liner ports 65 have been closed by valve sleeve 15. Valve sleeve 55 will cover lenses 87 during the combustion phase of the cycle.

Referring again to FIG. 2, pulse combustion engine 51 has a purge means for purging the combustion chamber 60 of combustion products after the combustion has occurred and before the next cycle begins. This includes a plurality of purge ports 91 located within liner upstream end wall 61. Preferably, there are at least two purge ports 91. A flame arrester 93 is mounted to each purge port 91 to reduce the possibility of any flames from flowing upstream. Valve sleeve 55 has an upstream end wall 95 which is located directly upstream from liner upstream end wall 61. Valve sleeve upstream end wall 95 is parallel to liner end wall 61 and perpendicular to longitudinal axis 54. Valve sleeve upstream wall 95 rotates with valve sleeve 55 and is sealed on both the upstream and downstream sides by spring-biased seals 96.

A plurality of valve sleeve purge ports 97 extend through valve sleeve upstream wall 95. A purge manifold 99 directs a purge fluid, such as air, from the upstream end of gear case 58 to the valve sleeve purge ports 97. Four times per revolution, valve sleeve purge ports 97 will open liner purge ports 91, admitting a purge fluid, which is air flowing through diffuser section 23. Valve sleeve purge ports 97 are positioned so that they will admit the purge fluid immediately after each combustion occurs and before the valve sleeve ports 67 and outer valves 72 admit the next mixture of fuel and oxydizer.

In operation, an external power source will rotate drive train 57. This rotates outer valves 72 and valve sleeve 55. Unmixed fuel is supplied to several of the manifold inlet ports 77, including some of the inlet ports 77 near the upstream end. Pure oxygen may be supplied to some of the other inlet ports 77, including some of the inlet ports located near the upstream end. Because the four manifolds 71 are separate, the most upstream inlet port 77 of one manifold may be receiving oxygen, while the most upstream inlet port 77 of another manifold 71 may be receiving hydrocarbon fuel. Some or all of the downstream inlet ports 77 will be supplied with air from diffuser section 23.

The fuel and oxygen will flow into combustion chamber 60 when manifold inlet ports 77, valve passage 79, manifold outlet ports 81, housing ports 69, valves sleeve ports 67, and liner ports 65 align. The fuel and oxygen or air mix immediately thereafter, and liner ports 65 and valve passages 79 will close. Purge ports 91 will also be closed. The igniter ports 89 will align with igniter ports 90, 87, causing the igniters 85 to focus on axis 54. The focusing of the igniters 85 creates a spark which ignites the combustible fuel mixture in combustion chamber 60. This combustion creates a high temperature, high pressure, combustion wave which discharges out open downstream end 63, creating thrust. A reverberating expansion wave is created by the initial combustion wave. The expansion wave reflects off the upstream end wall 61 and discharges from the open downstream end 63, creating additional thrust. The closure of valve sleeve ports 67 and valve passages 79 eliminate hot products and hot metal from coming into contact with fuel or oxygen that has not yet been introduced into the combustion chamber 60.

Immediately after, but prior to liner ports 65 again opening, purge ports 91 open by alignment with the valve sleeve purge ports 97. Air supplied from diffuser section 23 through purge manifold 99 will flow into combustion chamber 60. The purge air removes hot products and dilutes trapped reactants from combustion chamber 60. Immediately thereafter, liner ports 65 again open to repeat the process. The rotational speed of valve sleeve 55 is selected to create pulses at a rate of approximately 100 cycles per second.

The pulse combustion engine described above is a typical engine that can be easily adapted for use with the preferred embodiment of the present invention (see FIG. 1). As mentioned previously, bypass air is injected into pulse combustion engines 15 as needed for proper operation. The timing and amount of air allowed into a pulse combustion engine is a function of the rate of opening and closing of the engine's valves. Bypass air, which travels through diffuser section 23, enters a manifold (not shown) connected to each pulse combustion engine 15. The valves, which are synonymous to valves 72 in FIGS. 2 and 3, open to allow the bypass air and fuel into an engine chamber before combustion. After allowing the air/fuel mixture to enter the engine, the rotary valves close to allow combustion, which pressurizes the engine. Depending on how fast the rotary valves of a given engine operate, the engine would need more or less air.

Another important requirement related to the air intake of pulse combustion engine 15 is the need to "match" the consumption of bypass fan 19 to the pulse engines 15. Pulse engines 15 can be arranged in an annular fashion or in any other ganged arrangement so that the consumption of bypass air is matched to the engines. If the match is not equal, bypass doors and additional valves can be provided (not shown).

As previously mentioned, a pulse combustion engine must be supplied with shaft power.

Referring briefly to FIG. 2, shaft power for pulse engine 51 is supplied to gear train 57 to rotate valve sleeve 55 and rotary valves 72 during operation of the engine. In the preferred embodiment of the present invention, shaft power for pulse engine 15 can be provided by gas turbine engine 13 or by an alternate power source.

A first alternate embodiment is illustrated in FIG. 3A. A combination pulse combustion/gas turbine engine 111 includes a gas turbine engine 113, which is used in conjunction with a pulse engine 115. Gas turbine engine 113 has a housing 117, a bypass fan 119, a central engine core 121, and a diffuser section 123. In this alternate embodiment, pulse engine 115 is fluidly connected to gas turbine engine 113 by a duct 125. A bypass valve 127 may or may not be disposed in duct 125 to selectively allow bypass air to enter duct 125. A controller 129 initializes operation of pulse engine 115 and controls the operation of bypass valve 127, if a valve is used.

The operation of combination engine 111 is very similar to combination engine 11. Bypass air from the gas turbine engine 113 is supplied to pulse combustion engine 115 during operation of pulse engine 115. In general, the amount of air consumed by pulse engine 115 is dependent on the rate of opening and closing of the rotary valves (not shown) of pulse engine 115.

Figure 4:
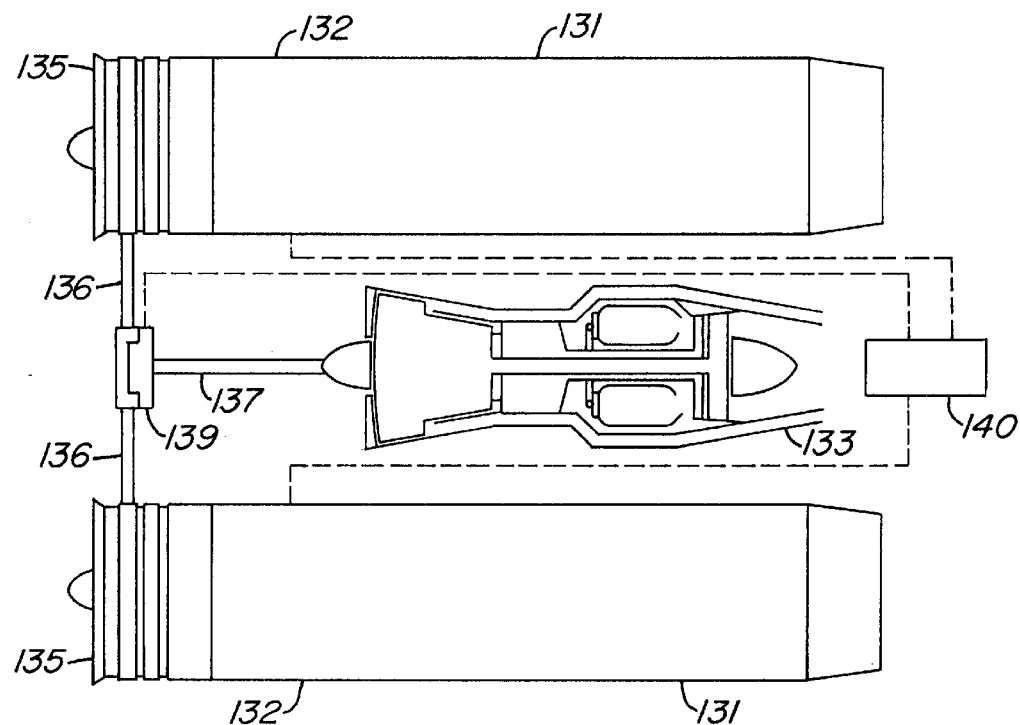
FIG. 4 is a schematic top view of an alternate embodiment of a pulse combustion/gas turbine engine combination according to the present invention.
Figure 5:
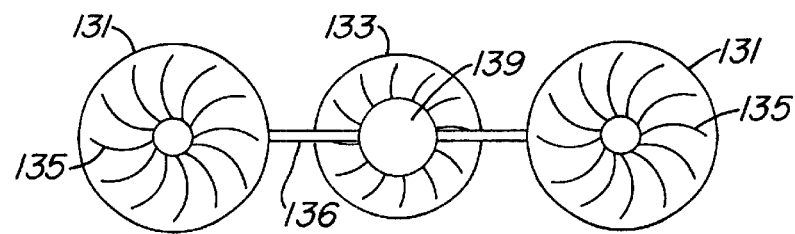
FIG. 5 is a schematic front view of the pulse combustion/ gas turbine engine combination of FIG. 4.

A second alternate embodiment of the present invention is illustrated in FIGS. 4 and 5. In this alternate embodiment, a series of pulse combustion engines 131, each engine 131 having a housing 132, is used in conjunction with a jet engine 133 that may or may not include an afterburner. Although jet engine 133 is illustrated as a turbo fan engine, jet engine 133 could also be a turbo jet engine with no bypass fan. Situated upstream of each pulse engine 131 is a fan 135 connected to a driven shaft 136. Preferably, fan 135 is a two stage fan that develops pressure ratios of three to one over ambient pressure. The additional pressure provided by fan 135 amplifies the thrust of pulse engines 131.

Power to driven shaft 136 is supplied by jet engine 133. Jet engine 133 has an output drive shaft 137 that is supplied power by jet engine 133. A clutch 139 is operably connected to driven shaft 136 and output drive shaft 137 so that shaft power is selectively supplied to fans 135.

The use of clutch 139 allows power to fans 135 to be discontinued when pressure amplification by the fans 135 is not needed. Such a situation exists at high aircraft speeds, typically between Mach 2.5 and 3.0. At these speeds, the fans provide very little pressure amplification, and pressure amplification is not needed due to high ram air pressures. When ram air pressures reach an acceptable level, clutch 139 can be disengaged so that fans 135 are no longer powered by jet engine 133. At this point, pulse combustion engines 131 would continue to run with ram air being supplied to the engines. Also, fans 135 are disengaged when all thrust is being supplied by jet engine 133 and pulse engines 131 are not operating.

Any typical pulse combustion engines could be used in the second alternate embodiment; however, it is preferred that pulse engines 131 be similar to the engine illustrated in FIGS. 2 and 3. Shaft power to pulse engines 131 could be supplied by jet engine 133 or by an alternative source, but it is important that power to pulse engines 131 be provided independently of the power provided to fans 135. In other words, when clutch 139 is disengaged and power to fans 135 is halted, pulse engines 131 should continue to be able to receive power if engines 131 are operating. The power supplied to the engines 131 is necessary to turn the rotary valves and valve sleeve for proper operation. This power could be supplied by the jet engine 133 which could be operated at a low power level while at high aircraft speeds.

Although FIGS. 4 and 5 illustrate only two pulse combustion engines 131, it is conceivable to arrange several pulse engines, each engine having its own housing as in FIG. 4, around a single jet engine. Another possibility would be to dispose a group of several pulse engines within one housing. In such an arrangement, the group of engines would be disposed in a housing such as housing 132 with all of the engines in that housing being supplied by a common fan such as fan 135. A controller 140, which is part of the aircraft's computer system, controls clutch 139 and the operation of pulse engines 131.

Figure 8:
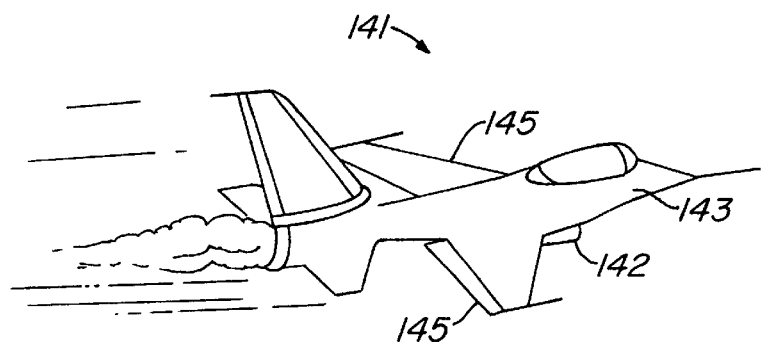
FIG. 8 is a perspective view of an airplane employing the engines of FIG. 1, FIG. 3A, or FIG. 4.

FIG. 8 illustrates a military airplane 141 that has engines 142 as shown in FIG. 1, FIG. 3A, or FIG. 4. Airplane 141 has a fuselage 143 and wings 145.

Several advantages are presented by use of a pulse combustion engine in combination with a gas turbine engine. Some performance estimates for the present invention are illustrated graphically in FIGS. 6 and 7. All engines compared in FIGS. 6 and 7 have the same incoming airflow.

Figure 6:
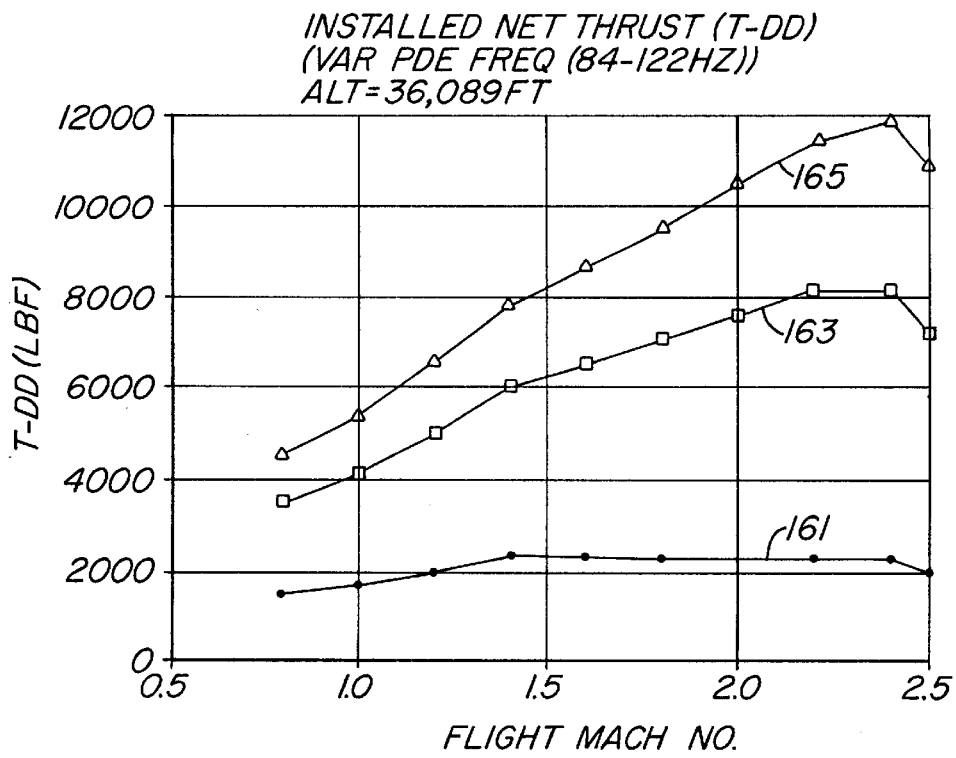
FIG. 6 is a performance chart illustrating the net thrust versus flight Mach number for various engine configurations.

FIG. 6 illustrates the installed net thrust production for three different engine scenarios: a turbo fan engine operating at mil power (no afterburner) 161, a turbo fan engine operating at maximum power (with afterburner) 163, and a hybrid turbo fan/pulse combustion engine 165. The installed thrust of the hybrid engine is approximately six times higher than a turbo fan operating at mil power between Mach numbers 2.0 and 2.5. In other words, for the same airflow entering both engines, the thrust amplification factor for the hybrid engine is approximately six. The hybrid engine also exhibits thrust amplification when compared to the turbo fan engine operating at max power.

Figure 7:
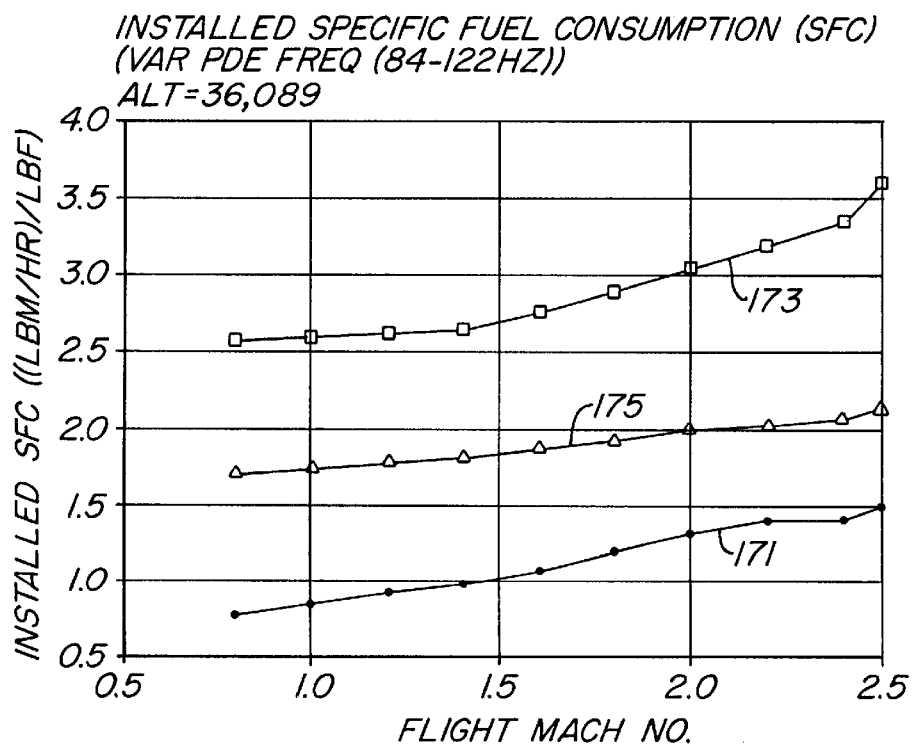
FIG. 7 is a performance chart illustrating the specific fuel consumption versus flight Mach number for various engine configurations.

FIG. 7 illustrates the installed specific fuel consumption for three engine scenarios: a turbo fan engine operating at mil power (no afterburner) 171, a turbo fan engine operating at maximum power (with afterburner) 173, and a hybrid turbo fan/pulse combustion engine 175. The hybrid engine, over a Mach range of 0.6 to 2.5, has fuel consumption that is greater than a turbo fan engine operating at mil power but less than a turbo fan engine operating at max power. By considering this data in conjunction with the thrust data provided in FIG. 6, it is clearly evident that the advantages provided by the net thrust of the hybrid engine are not compromised by the engine's fuel consumption.

The primary advantage of the present invention is that it combines the strengths of the steady state gas turbine engine with the strengths of the pulse combustion engine. The primary weakness of a pulse engine is its lack of ability to provide shaft power output for electrical and hydraulic power. The primary weakness associated with gas turbine engines is the temperature limits of the turbine blades at high Mach numbers. By combining a pulse engine with a steady state gas turbine engine, the individual weaknesses inherent to these engine types are eliminated.

The combined cycle pulse combustion/gas turbine engine allows operation over a wider range of speeds. Since pulse combustion engines are most efficient when operating at higher speeds, the gas turbine engine can be used as the primary power supply at lower speeds. At higher speeds, the pulse engine can be used as the primary thrust generator.

The gas turbine engine not only supplies thrust at the lower speeds but also powers a fan for delivery of pressurized air to the pulse combustion engine. The pressurized air greatly enhances the thrust capabilities of the pulse combustion engine and allows the pulse combustion engine to operate at lower speeds.

It should be apparent from the foregoing that an invention having significant advantages has been provided. While the invention is shown in only one of its forms, it is not just limited but is susceptible to various changes and modifications without departing from the spirit thereof.

We claim:

1. An aircraft having wings and a fuselage comprising:
   a gas turbine engine, which supplies thrust to the aircraft;
   an output drive shaft rotated by the gas turbine engine;
   a pulse detonation engine, which supplies thrust to the aircraft;
   a fan located upstream of the pulse detonation engine but not upstream of the gas turbine engine for delivering air to the pulse detonation engine;
   a driven shaft connected to the fan for operating the fan; and
   a clutch operably connected to the drive shaft and the driven shaft for selectively rotating the fan for supplying pressurized air to the pulse detonation engine.

2. The aircraft according to claim 1 further comprising:
   a controller for disengaging the clutch at higher aircraft speeds such that the fan is no longer powered by the gas turbine engine; and
   the pulse detonation engine is adapted to receive high pressure ram air when the clutch is disengaged.

3. The aircraft according to claim 1 wherein:
   a controller for disengaging the clutch at lower aircraft speeds such that the fan is not powered by the gas turbine engine; and
   wherein the controller prevents the pulse detonation engine from operating at the lower aircraft speeds.

4. The aircraft according to claim 1 further comprising:
   a second pulse detonation engine, which is also supplies thrust to the aircraft;
   a second fan located upstream of the second pulse detonation engine but not upstream of the gas turbine engine;
   a second driven shaft connected to the second fan for operating the second fan;
   each of the pulse detonation engines being mounted laterally from the gas turbine engine; and
   the clutch being operably connected to the drive shaft and both the first mentioned driven shaft and the second driven shaft for selectively rotating the first mentioned fan and second fan for supplying pressurized air to the first mentioned pulse detonation engine and the second pulse detonation engine.

5. The aircraft according to claim 4 further comprising:

a controller for disengaging the clutch at lower aircraft speeds such that the fans are not powered by the gas turbine engine; and the controller preventing the first mentioned pulse detonation engine and the second pulse detonation engine from operating at lower aircraft speeds.

6. The aircraft according to claim 4 further comprising:

a controller for disengaging the clutch at selected higher aircraft speeds such that the fans are no longer powered by the gas turbine engine; and both the first mentioned pulse detonation engine and the second pulse detonation engine are adapted to receive high pressure ram air when the clutch is disengaged.

7. The aircraft according to claim 1, wherein the pulse detonation engine has a detonation chamber and a rotary valve that opens and closes continuously during operation of the pulse detonation engine to admit air and fuel to the chamber, the rotary valve being driven by the gas turbine engine independently of whether the clutch is causing the driven shaft and the fan to rotate.

8. An aircraft having wings and a fuselage comprising:

a gas turbine engine, which supplies thrust to the aircraft;

an output drive shaft rotated by the gas turbine engine;

a plurality of pulse detonation engines, which supply thrust to the aircraft;

at least one fan located upstream of the pulse detonation engines for delivering air to the pulse detonation engine but not the gas turbine engine;

a driven shaft connected to the fan for operating the fan;

a clutch operably connected to the drive shaft and the driven shaft for selectively rotating the fan for supplying pressurized air to the pulse detonation engines;

a controller for disengaging the clutch at lower aircraft speeds and at higher aircraft speeds such that the fan is not powered by the gas turbine engine, the fan adapted to receive high pressure ram air when the clutch is disengaged; and wherein the controller selectively prevents the pulse detonation engines from operating while at lower aircraft speeds.

9. The aircraft according to claim 8, wherein each of the pulse detonation engines has a detonation chamber and a rotary valve that opens and closes continuously during operation of the pulse detonation engine to admit air and fuel to the chamber, the rotary valve being driven by the gas turbine engine independently of whether the clutch is causing the driven shaft and the fan to rotate.

* * * * *